United States Patent
Hosono et al.

(10) Patent No.: US 10,016,742 B2
(45) Date of Patent: Jul. 10, 2018

(54) MAYENITE-TYPE COMPOUND CONTAINING IMIDE ANION, AND METHOD FOR PRODUCING SAME

(71) Applicants: JAPAN SCIENCE AND TECHNOLOGY AGENCY, Kawaguchi-shi (JP); TOKYO INSTITUTE OF TECHNOLOGY, Meguro-ku (JP)

(72) Inventors: Hideo Hosono, Tokyo (JP); Fumitaka Hayashi, Tokyo (JP); Toshiharu Yokoyama, Tokyo (JP); Masaaki Kitano, Tokyo (JP)

(73) Assignees: JAPAN SCIENCE AND TECHNOLOGY AGENCY, Kawaguchi-shi (JP); TOKYO INSTITUTE OF TECHNOLOGY, Meguro-ku (JP)

( * ) Notice: Subject to any disclaimer, the term of this patent is extended or adjusted under 35 U.S.C. 154(b) by 0 days.

(21) Appl. No.: 15/123,602

(22) PCT Filed: Feb. 12, 2015

(86) PCT No.: PCT/JP2015/053861
§ 371 (c)(1),
(2) Date: Sep. 2, 2016

(87) PCT Pub. No.: WO2015/133240
PCT Pub. Date: Sep. 11, 2015

(65) Prior Publication Data
US 2017/0072382 A1    Mar. 16, 2017

(30) Foreign Application Priority Data
Mar. 7, 2014    (JP) .................................. 2014-044716

(51) Int. Cl.
*B01J 20/04*    (2006.01)
*C01F 7/16*    (2006.01)
(Continued)

(52) U.S. Cl.
CPC ............. *B01J 20/041* (2013.01); *B01J 20/08* (2013.01); *C01C 1/006* (2013.01); *C01F 7/164* (2013.01);
(Continued)

(58) Field of Classification Search
CPC .......... B01J 20/08; B01J 20/041; C01F 7/166; C01F 7/164; C01C 1/006; C01P 2006/40; C01P 2002/82; C01P 2002/86
See application file for complete search history.

(56) References Cited

FOREIGN PATENT DOCUMENTS

| CN | 101184696 A | 5/2008 |
|----|-------------|--------|
| CN | 102171150 A | 8/2011 |

(Continued)

OTHER PUBLICATIONS

Polfus et al. "Nitrogen and hydrogen defect equilibria in Ca12Al14O33: a combined experimental and computational study" J. Mater. Chem., 2012, 22, 15828-15835.*

(Continued)

*Primary Examiner* — Anthony J Zimmer
*Assistant Examiner* — Syed T Iqbal
(74) *Attorney, Agent, or Firm* — Oblon, McClelland, Maier & Neustadt, L.L.P.

(57) ABSTRACT

The invention related to a material that can stably hold an imide anion ($NH^{2-}$) therein even in the atmosphere or in a solvent, and a method for synthesizing the material and a use of the material. A mayenite-type compound into which imide anions are incorporated at a concentration of $1 \times 10^{18}$ $cm^{-3}$ or more are provided. The mayenite-type compound can be produced by heating a mayenite-type compound (Continued)

including electrons or free oxygen ions in a cage thereof, in liquefied ammonia at 450 to 700° C. and at a pressure of 30 to 100 MPa. The compound has properties such that active imide anions can be easily incorporated into the compound and the active imide anions can be easily released in the form of ammonia from the compound, and the compound has chemical stability.

6 Claims, 3 Drawing Sheets

(51) Int. Cl.
    *C01C 1/00*     (2006.01)
    *B01J 20/08*     (2006.01)
(52) U.S. Cl.
    CPC .......... *C01F 7/166* (2013.01); *C01P 2002/82* (2013.01); *C01P 2002/86* (2013.01); *C01P 2006/40* (2013.01)

(56) References Cited

FOREIGN PATENT DOCUMENTS

| EP | 2 351 708 A1 | 8/2011 |
|---|---|---|
| EP | 2 394 959 A1 | 12/2011 |
| JP | 2002-003218 A | 1/2002 |
| JP | 2005-314196 A | 11/2005 |
| JP | 2008-214302 A | 9/2008 |
| JP | 2009-203126 A | 9/2009 |
| JP | 2011-153056 A | 8/2011 |
| WO | 2005/000741 A1 | 1/2005 |
| WO | WO 2005/077859 A1 | 8/2005 |
| WO | 2007/060890 A1 | 5/2007 |
| WO | 2010/041558 A1 | 4/2010 |
| WO | 2010/090266 A1 | 8/2010 |

OTHER PUBLICATIONS

Hayashi et al. "NH2—Dianion Entrapped in a Nanoporous 12CaO•7Al2O3 Crystal by Ammonothermal Treatment: Reaction Pathways, Dynamics, and Chemical Stability" 2014, J. Am. Chem. Soc., 136, 11698-11706.*

International Search Report dated Mar. 17, 2015 in PCT/JP2015/053861 filed Feb. 12, 2015.

Uri Ash-Kurlander et al., "Playing Hardball with Hydrogen: Metastable Mechanochemical Hydrogenation of Magnesium Nitride", J. Phys. Chem., 2013, vol. 17, pp. 1237-1246.

Toshida Baba et al., "Catalytic Properties of Low-valent Lanthanide Species introduced into Y-Zeolite", J. Chem. Soc. Faraday Trans., 1992, vol. 88, No. 6, pp. 891-897.

Hans Bartl et al., "Untersuchung der Wasserstoffbindungen in Zunyit, $Al_{12}(OH,F)_{18}[AlO_4][Si_5O_{16}]Cl$, durch Neutronenbeugung", N. Jahrb Mineral Monatsch, 1970, 4 pages (with English abstract).

Satoru Matsuishi et al., "High-Density Electron Anions in a Nanoporous Single Crystal: $[Ca_{24}Al_{28}O_{64}]^{4+}(4e^-)$", Science, 2003, vol. 301, pp. 626-629.

Satoru Matsuishi et al., "Direct Synthesis of Powdery Inorganic Electride $[Ca_{24}Al_{28}O_{64}]^{4+}(4e^-)_4$ and Determination of Oxygen Stoichiometry", Chem. Mater., 2009, vol. 21, pp. 2589-2591.

Hans Boysen et al., "Anion Diffusion Processes of O- and N-Mayenite Investigated by Neutron Powder Diffraction", Diffusion Fundamentals, 2008, vol. 8, 7 pages.

H. Boysen et al., "Structures and properties of variously doped Mayenite investigated by neutron and synchrotron powder diffraction", Z. Kristallogr. Suppl., 2009, vol. 30, pp. 323-328.

H. Boysen et al., "Disorder and Diffusion in Mayenite", Acta Physica Polonica A, 2010, vol. 117, pp. 38-41.

Jonathan M. Polfus et al., "Nitrogen and hydrogen defect equilibria in $Ca_{12}Al_{14}O_{33}$: a combined experimental and computational study", J. Mater. Chem., 2012, vol. 22, pp. 15828-15835.

D. Peters et al., "Ammonothermalsynthese von kristallinem siliciumnitridimid, $Si_2N_2NH$", Journal of the Less-Common Metals, 1989, vol. 146, pp. 241-249 (with English abstract).

Chun Yi Liu et al., "Effect of the Cl/Br Molar Ratio of a CaCl2—CaBr2 Mixture Used as an Ammonia Storage Material", Ind. Eng. Chem. Res., 2004, vol. 43, pp. 6994-7000.

Fumitaka Hayashi et al., "$NH^{2-}$ Dianion Entrapped in a Nanoporous 12CaO•7Al2O3 Crystal by Ammonothermal Treatment: Reaction Pathways, Dynamics, and Chemical Stability", J. Am. Chem. Soc., 2014, vol. 136, pp. 11698-11706.

Combined Office Action and Search Report dated Apr. 24, 2017 in Chinese Patent Application No. 201580011848.7 (with partial unedited computer generated English translation of Search Report).

* cited by examiner

MAYENITE-TYPE COMPOUND CONTAINING IMIDE ANION, AND METHOD FOR PRODUCING SAME

TECHNICAL FIELD

The present invention relates to a mayenite-type compound containing an imide anion ($NH^{2-}$), a method for producing the same, and a use thereof.

BACKGROUND ART

A metal imide containing an imide anion ($NH^{2-}$), for example, magnesium imide (MgNH) or the like, can be changed into magnesium hydride and a magnesium amide through a reaction with hydrogen without changing the basic structure. Since this change is reversible, metal imides have attracted attention as a precursor of a hydrogen storage material (NON-PATENT DOCUMENT 1) in recent years.

In addition, for example, it is well known that an imide compound such as EuNH accelerates catalytic reactions of olefins as a strong base, such as an isomerization reaction (NON-PATENT DOCUMENT 2). However, since a metal imide generally has extremely high reactivity, there arises a problem in that the metal imide decomposes as soon as it is left in the atmosphere.

On the other hand, among calcium aluminosilicates having CaO, $Al_2O_3$, and $SiO_2$ as constitutional components, there is substance whose mineral name is mayenite. Compounds having the same type of crystal structure as the crystal structure of mayenite are referred to as "mayenite-type compounds". Mayenite compounds can be generally synthesized by mixing $CaCO_3$ and $Al_2O_3$ raw materials and then heating the mixture at a high temperature (1,300° C.).

Mayenite-type compounds have a typical composition represented by $12CaO.7Al_2O_3$ (hereinafter, referred to as "C12A7"), and its unit cell is composed of bimolecular C12A7. That is, it can be represented by a composition formula of $2(12CaO.7Al_2O_3)=Ca_{24}Al_{28}O_{66}$, in which two oxygen ions out of 66 oxygen ions are clathrated in the form of "free oxygen" in a space of a cage formed by the crystal skeleton (NON-PATENT DOCUMENT 3). The resultant chemical formula is represented by $[Ca_{24}Al_{28}O_{64}]^{4+}.2O^{2-}$.

In a mayenite-type compound, Ca constituting the above-mentioned representative composition formula may be partially or entirely substituted with at least one or more typical metal elements or transition metal elements, which are selected from the group consisting of Li, Na, K, Mg, Sr, Ba, Sc, Ti, V, Cr, Mn, Fe, Co, Ni, Cu, Ir, Ru, Rh, and Pt. In addition, Al constituting the above-mentioned representative composition formula may be partially or entirely substituted with at least one or more typical metal elements or transition metal elements, which are selected from the group consisting of B, Ga, C, Si, Fe, and Ge. Further, O constituting the above-mentioned representative composition formula may be partially or entirely substituted with at least one or more typical elements or metal elements, which are selected from the group consisting of H, F, Cl, Br, and Au.

Since free oxygen ions included in mayenite are present in the cage, the oxygen ions are prevented from reacting directly with the external atmosphere. However, in the year of 2000, the present inventors found a method for generating $O^-$ and $O_2^-$, which are active oxygen species, in a cage by subjecting raw materials to a solid phase reaction under conditions of a controlled atmosphere and temperature (PATENT DOCUMENT 1).

After the year of 2003, the present inventors clarified that free oxygen ions included in mayenite can be substituted with various anions. Particularly, all of the free oxygen ions can be substituted with electrons by holding C12A7 in a strong reducing atmosphere. C12A7 in which the free oxygen ions are substituted with electrons can be represented by a chemical formula of $[Ca_{24}Al_{28}O_{64}]^{4+}(e^-)_4$ (hereinafter referred to as "C12A7:e"). In addition, a substance containing electrons substituted for anions as described above is called an electride, and the electride features having a good electron conductivity (NON-PATENT DOCUMENTs 4 and 5).

The present inventors also found C12A7:e that is a conductive mayenite-type compound, $12SrO.7Al_2O_3$ that is a compound of the same type as C12A7, a mixed crystal compound of C12A7 and $12SrO.7Al_2O_3$, and a production method thereof (PATENT DOCUMENT 2).

In addition, the present inventors found that C12A7:e having conduction electrons at a concentration of $1×10^{19}/cm^3$ or more and a compound of the same type as C12A7 can be obtained by (a) a method of annealing a C12A7 single crystal including oxygen ions (hereinafter referred to as "C12A7:O") at high temperature in an alkali metal or alkaline earth metal vapor, (b) a method of ion-implanting inactive ions into a C12A7 single crystal, or (c) a method of direct solidification from a melt of a C12A7 single crystal in a reducing atmosphere (PATENT DOCUMENT 3).

Moreover, the present inventors have succeeded in obtaining C12A7:e, which exhibits metallic electrical conductivity, by annealing a C12A7:O single crystal in a titanium metal (Ti) vapor, and have filed a patent application related to an invention regarding a production method of C12A7:e and use thereof as an electron emission material (PATENT DOCUMENT 4).

Since electrons clathrated in C12A7:e are loosely bonded in a cage of a crystal skeleton of cations, these electrons can be extracted to the exterior by applying an electrical field or by employing chemical methods. On the basis of an idea that those electrons extracted to the exterior can be used in a reductive reaction, the present inventors have invented a method of producing secondary alcohol and diketone compounds by reducing ketone compounds by the electrons clathrated in C12A7:e and have filed a patent application related to the method (PATENT DOCUMENT 5).

Moreover, a patent application related to an invention regarding a mayenite-type compound in which Al is partially substituted with Ga or In has also been filed (PATENT DOCUMENT 6), and such a mayenite-type compound is suitable as an electrode material requiring high-temperature heat treatment, such as a PDP protective film material or a charge injection material in an organic EL device. A patent application related to an invention in which a C12A7 compound having a hydride concentration of $1×10^{18}/cm^3$ or more can be obtained by a heat treatment under a hydrogen atmosphere has also been filed (PATENT DOCUMENT 7).

On the other hand, an attempt in which C12A7:O is subjected to a heat treatment in an ammonia gas stream to introduce a nitrogen species into the cage has been reported. For example, Boysen et al. have obtained nitrided mayenite by treating C12A7:O in an ammonia gas stream at 950° C. for 10 hours (NON-PATENT DOCUMENTs 6 to 8). The content of nitrogen in the obtained samples was within a range of 0.6 to 1.2% by weight, and it has been reported that the introduced nitrogen species was a monovalent amide anion ($NH_2^-$) from the results of neutron diffraction analysis.

Similarly, Polfus et al. have reported that C12A7:O has been subjected to a nitriding treatment at 950° C. (NON-PATENT DOCUMENT 9), and using X-ray photoelectron spectroscopy (XPS) and gas phase mass spectrometry (GP-MS), that $NH_2^-$ is incorporated into the cage of C12A7. Further, Polfus et al. have mentioned that not only is $NH_2^-$ incorporated into the mayenite cage but also the oxygen ions in the skeleton are partially substituted with trivalent nitrogen ions ($N^{3-}$).

[PATENT DOCUMENT 1] Japanese Unexamined Patent Application, First Publication No. 2002-003218
[PATENT DOCUMENT 2] Japanese Unexamined Patent Application, First Publication No. 2005-314196
[PATENT DOCUMENT 3] Republished Japanese Translation No. WO2005/000741 of the PCT International Publication for Patent Applications
[PATENT DOCUMENT 4] Republished Japanese Translation No. WO2007/060890 of the PCT International Publication for Patent Applications
[PATENT DOCUMENT 5] Japanese Unexamined Patent Application, First Publication No. 2008-214302
[PATENT DOCUMENT 6] Japanese Unexamined Patent Application, First Publication No. 2009-203126
[PATENT DOCUMENT 7] WO2010/090266
[NON-PATENT DOCUMENT 1] U. Ash-Kurlander, G. E. Shter, S. Kababya, A. Schmidt, and G S. Grader, J. Phys. Chem. C, 117, 1237-1246, (2013)
[NON-PATENT DOCUMENT2] T. Baba, G J. Kim, Y. Ono, J. Chem. Soc., Faraday Trans., 88, 891-897, (1992)
[NON-PATENT DOCUMENT 3] H. B. Bard, T. Scheller, N. Jahrb Mineral Monatsh, 547, (1970)
[NON-PATENT DOCUMENT 4] S. Matsuishi, Y Toda, M. Miyakawa, K. Hayashi, T. Kamiya, M. Hirano, I. Tanaka and H. Hosono, Science, 301, 626-629, (2003)
[NON-PATENT DOCUMENT 5] S. Matsuishi, T. Nomura, M. Hirano, K. Kodama, S. Shamoto and H. Hosono, Chemistry of Materials, 21, 2589-2591, (2009)
[NON-PATENT DOCUMENT 6] H. Boysen, I. Kaiser-Bischoff, M. Lerch, Diffusion Fundamentals, 8, 2-1-2-8, (2008)
[NON-PATENT DOCUMENT 7] H. Boysen, I. Kaiser-Bischoff, M. Lerch, S. Berendts, A. Borger, D. M. Trots. M. Hoelzel, A. Senyshyn, ZEITSCHRIFT fur RISTAL-LOGRAPIIIE suppl., 30, 323-328, (2009)
[NON-PATENT DOCUMENT 8] H. Boysen, I. Kaiser-Bischoff, M. Lerch, S. Berendts, M. Hoelzel, A. Senyshyn, Acta Physica Polonica A, 117, 38-41, (2010)
[NON-PATENT DOCUMENT 9] J. M. Polfus, K. Toyoura, C. H. Hervoches, M. F. Sunding, I. Tanaka, R. Haugsrud, Journal of Material Chemistry 22, 15828-15835, (2012)

SUMMARY OF INVENTION

Since metal imides have hydrogen storage properties and exhibit strong basicity, metal imides can be applied as a hydrogen storage material, a solid basic catalyst, or the like. However, conventional metal imides decompose through a rapid reaction with water vapor in the atmosphere or the like and thus it is difficult to put metal imides into practical use as a functional material. The present invention is to develop a material which holds an imide anion ($NH^{2-}$) stably even in the atmosphere and in a solvent and to provide a synthesizing method and a use thereof.

As a result of intensive investigation of the present inventors regarding a possibility of introducing novel anions into a cage of a C12A7 compound, it has been found that a mayenite-type compound immersed in liquefied ammonia in a predetermined temperature range has a property of incorporating an imide anion into the cage. That is, since the size of the cage of C12A7 is about 4 Å and the size of the imide anion is about 3 Å, it is considered that the imide anion is incorporated into the cage by the treatment of the present invention.

The present invention makes it possible to first synthesize an imide anion-containing compound that is stable even in the atmosphere and in a solvent and to provide a usable inorganic imide compound. A mayenite-type compound into which imide anions are incorporated according to the present invention has a maximum NH content of about 0.26% by weight, which corresponds to about $2.7 \times 10^{20}$ $cm^{-3}$ in terms of NH concentration. In addition, from the results of temperature programmed desorption measurement (FIG. 1), properties are exhibited in which the mayenite-type compound is stable up to about 500° C. and when the temperature reaches a temperature of equal to or higher than the above-mentioned temperature, the imide anions are released in the form of ammonia ($NH^{2-}+2OH^- \rightarrow 2O^{2-}+NH_3$ or $NH^{2-}+2H^- \rightarrow 4e^-+NH_3$).

It is found that when calcium oxide, alumina, or a complex oxide thereof not having a cage structure is immersed in liquefied ammonia and subjected to a heating treatment in the same manner, imide anions are not incorporated into the compound. On the other hand, in the case of the C12A7 compound, imide anions can be incorporated into the compound through a treatment using liquefied ammonia. Accordingly, it is considered that the clathration of the imide anions occurs due to the distinctive nanoporous cage structure of the mayenite-type compound. In addition, the imide anions can be incorporated into the compound irrespective of anion species included in the cage of the matrix.

In addition, from tests of exposure to the atmosphere and tests of immersion in organic solvents, it has been confirmed that the mayenite-type compound containing imide anions is stable in the atmosphere and organic solvents. From the above results, it has been found that the present invention makes it possible to incorporate imide anions including $NH^{2-}$ at a concentration of $1 \times 10^{18}$ $cm^{-3}$ or more and having chemical stability into the mayenite-type compound. $NH^{2-}$ can be incorporated into the mayenite-type compound at a concentration of about $1.1 \times 10^{21}$ $cm^{-3}$, which is a theoretical maximum value. However, various applications can be made with a content corresponding to about 0.1% of the above concentration.

A high temperature liquefied ammonia treatment method according to the method of the present invention has the following two advantages. First, the compound can come into contact with high density ammonia at a high pressure. That is, reaction efficiency can be enhanced. In addition, the possibility of active amide anions being generated by autoprotolysis as represented by Formula 1 to accelerate a reaction with the mayenite-type compound under high temperature and high pressure conditions may be considered. Second, since the reaction is conducted in a closed system using a high pressure vessel, unreacted ammonia can be recycled by collecting the ammonia.

$$2NH_3 \rightarrow NH_2^- + NH_4^+ \qquad (1)$$

The compound obtained by the present invention has such properties that active imide anions can be easily incorporated into the compound and the active imide anions can be easily released from the compound in the form of ammonia, and has chemical stability. Therefore, the compound can be applied to organic chemical synthesis as an imide anion donating material (aminating reagent). In addition, for example, the compound can be applied to other chemical reactions such as reductive reaction (for example, NOx reduction) as an ammonia supplying material.

DESCRIPTION OF EMBODIMENTS

Hereinafter, a mayenite-type compound containing imide anions at a concentration of $10^{18}$ cm$^{-3}$ or more (hereinafter, also referred to as a "compound of the present invention") and a method for producing the same will be described in detail.

<Production of Mayenite-Type Compound Base>

Hereinafter, C12A7, which is a representative composition of the mayenite-type compound will be described in detail. However, the present invention is not limited to C12A7 and can be applied to all mayenite-type compounds having the same type of crystal structure as C12A7, such as 12SrO.7Al$_2$O$_3$ in which Ca is substituted with Sr. The base composed of C12A7 used as a starting material of the present invention may be a molded body of a powder, a porous body, a solid sintered body, a thin film, a solid single crystal, or the like, and the shape of the molded body may be any shape. In addition, C12A7 supported on a support composed of a different material may be used for the base.

The raw materials for C12A7 are synthesized by a solid phase method, a hydrothermal method, a sol-gel method, or the like. A hydrothermal reaction is a reaction in which water participates under high temperature and high pressure conditions of 100° C. or higher and 1 atmospheric pressure or higher, and a ceramic powder can be synthesized by a reaction at a low temperature in a short period of time. A C12A7 powder having a large specific surface area (about 20 to 60 m$^2$g$^{-1}$) can be obtained by using the hydrothermal synthesizing method. For example, Ca$_3$Al$_2$(OH)$_{12}$ or aluminum hydroxide as hydroxide which becomes a precursor of C12A7 can be obtained by mixing water and calcium hydroxide or aluminum hydroxide with a stoichiometric composition and heating the mixture, for example, at 150° C. for about 6 hours. The powder is subject to a vacuum evacuation treatment at 750 to 900° C. to obtain C12A7. In addition, adsorbed water, hydroxyl groups on the surface, OH$^-$ in the cage, and the like can be removed and thus a reducing agent can be prevented from deactivation in a step of incorporating electrons.

<Step of Incorporating Conduction Electrons and Hydrogen Anions into C12A7 Base>

In the case of producing a C12A7 powder including conduction electrons, raw material powders for C12A7 with a chemical equivalent composition may be heated under a reduction atmosphere. A porous body or a solid sintered body of C12A7 including conduction electrons may be obtained by molding the material powders for C12A7 with a chemical equivalent composition and then heating the molded body with Ca, CaH$_2$, Ti, or the like under a reduction atmosphere. Regarding bases other than a thin film and a solid single crystal, a C12A7 base including conduction electrons can be directly formed from raw materials without an intermediate step of producing a C12A7 base not including conduction electrons. When a C12A7 base including hydrogen anions is heated with Ca or the like under a hydrogen gas stream or a reduction atmosphere in the same manner, a powder, a porous body, or a solid sintered body can be synthesized.

A thin film of C12A7 including conduction electrons can be produced by forming a thin film of C12A7 on a substrate of MgO, Y$_3$Al$_5$O$_{12}$, or the like by a pulsed laser deposition (PLD) method, a sputtering method, a plasma spraying method or the like using a solid sintered body of C12A7 as a target, and then depositing C12A7 by the PLD method again to form a single body while heating the resulting thin film of C12A7 to 500° C. or higher. In the second PLD process, since C12A7 in (Non-Patent Document) plasma state works as a reducing agent, conduction electrons are incorporated into the thin film. A thin film of C12A7 including hydrogen anions can be synthesized in the same manner.

In addition, a solid single crystal of C12A7 can be produced by pulling a seed crystal's rod from a melt obtained by melting raw material powders of C12A7 at about 1,600° C. to form a C12A7 single crystal (CZ method). Then, the resultant single crystal is put in a vacuum glass tube with a metal Ca powder, Ti powder, or the like, and then the glass tube is sealed. The glass tube is heated under a reduction atmosphere to incorporate conduction electrons into the solid single crystal. A solid single crystal of C12A7 including hydrogen anions can be synthesized in the same manner.

The solid sintered body or solid single crystal of C12A7 including conduction electrons or hydrogen anions can be processed into a powder. Pulverizing processing can be conducted by pulverization in a mortar, pulverization using a jet mill, or the like. The size of the powder is not particularly limited and particles having a particle diameter in a range of about 100 nm to 1 mm can be obtained by these methods. Through these methods, C12A7 including conduction electrons or hydrogen anions at a concentration of $1\times10^{15}$ cm$^{-3}$ or more can be produced.

Irrespective of the powder, the porous body, the solid sintered body, the thin film, and the solid single crystal produced by the methods, conduction electrons may lose from the surface portion of these bases. In this case, conduction electrons can be incorporated into the outermost surface of the base at a concentration of $1\times10^{15}$ cm$^{-3}$ or more by heating it in vacuum, an inert gas, or under a reduction atmosphere at the temperature range from 900° C. or higher to that lower than the melting point of the compound (1,250° C.).

<Step of Incorporating Imide Anions into Mayenite-Type Compound>

In the case of producing the compound of the present invention, a treatment of immersion in liquefied ammonia in a range of 450 to 700° C., more preferably in a range of 450 to 650° C., may be carried out by using a high pressure vessel such as an ammonothermal apparatus. When the temperature in the immersion treatment is 400° C. or lower, imide anions are not incorporated into the mayenite-type compound. When the temperature is higher than 700° C., it is not preferable because the decomposition reaction of the liquefied ammonia occurs.

The concentration of mayenite in the liquefied ammonia is from 0.05 to 50% by weight, preferably from 0.5 to 20% by weight, and more preferably from 1 to 10% by weight with respect to ammonia. When the concentration is less than 0.05% by weight, imide ions are effectively introduced into the cage, however, it is not preferable in terms of efficiency. On the other hand, when the concentration is more than 50% by weight, a long period of time is required to introduce imide ions and thus this case is not preferable. The treatment time may be various and depends on conditions such as treatment temperature and the concentration of mayenite in the liquefied ammonia. The treatment time is not limited as long as the treatment time is 1 minute or longer at a predetermined temperature.

It is considered that imide anions are incorporated in the following procedure. Ammonia reacts with oxygen ions ($O^{2-}$) or electrons ($e-$) clathrated in the skeleton of the mayenite-type compound as represented by Formula 2 or 3 to provide amide anions. Further, the amide anions react with oxygen ions ($O^{2-}$) or electrons ($e-$) clathrated in the skeleton as represented by Formulae 4 and 5 to provide imide anions and then the oxygen ions ($O^{2-}$) or the electrons ($e-$) are substituted with the imide anions. It is considered that a reaction for generating imide anions of Formulae 4 and 5 can be conducted because the reaction pressure is about 500 times higher than in a conventional gas phase ammonia treatment.

$$NH_3 + O^{2-}_{cage} \rightarrow NH_2^-{}_{cage} + OH^-{}_{cage} \quad (3)$$

$$NH_3 + e^-{}_{cage} \rightarrow NH_2^-{}_{cage} + H^-{}_{cage} \quad (3)$$

$$NH_2^-{}_{cage} + O^{2-}_{cage} \rightarrow NH^{2-}_{cage} + OH^-{}_{cage} \quad (4)$$

$$NH_2^-{}_{cage} + 2e^-{}_{cage} \rightarrow NH^{2-}_{cage} + H^-{}_{cage} \quad (5)$$

Although nano-clathration with nanoporous materials such as organometallic complexes, supermolecules, and zeolite is effective in stabilizing or storing an unstable chemical species, a specific method of stably clathrating an imide compound has not been known. Clathration of active imide anions with a mayenite compound has been succeeded for the first time at this time. This means that an active N1 chemical species (a nitride organic reaction reagent having a C—N bond forming capacity) is successfully stored.

The mayenite-type compound of the present invention into which imide anions are incorporated can be applied to, for example, synthesis of primary amines formed by hydroamination of olefins having an unsaturated bond, or the like. Typically, in the reaction of halogenated alkyl and ammonia, the nucleophilicity of the produced amine is high and alkylation proceeds sequentially so that primary amines cannot be obtained. In contrast, since imide anions can conduct a selective reaction to a nucleophile portion, such as double bond, it is possible to realize a selective reaction.

In addition, conventional materials do not have a property of releasing ammonia at a high temperature. This means that the compound can be used for a reductive reaction at a high temperature and can function as, for example, a promoter of a catalytic reaction such as NOx reduction.

Figure 2:
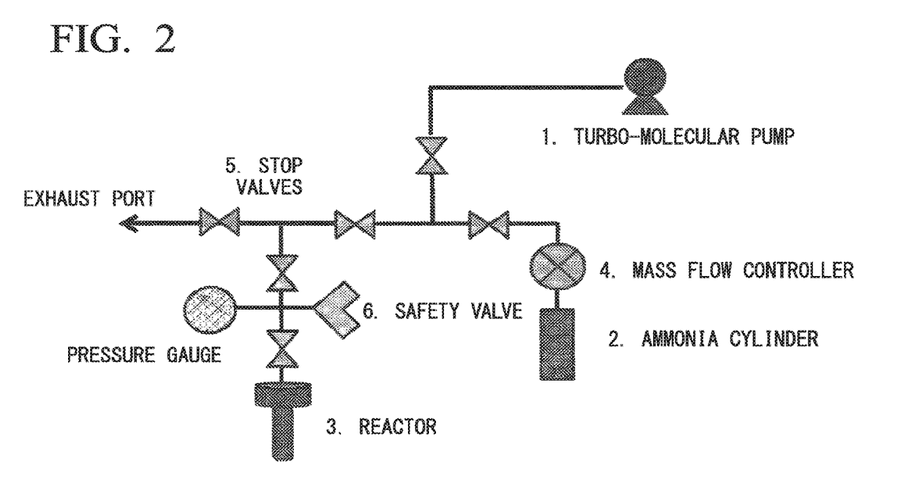
FIG. 2 is a schematic view of an ammonothermal synthesis apparatus for synthesizing the compound of the present invention.

Hereinafter, the present invention will be described in detail based on examples. FIG. 2 shows a schematic view of an ammonothermal apparatus used in the test. The apparatus is configured to include a turbo molecule pump 1, an ammonia cylinder 2, a reactor 3, and an exhaust port. In addition, in order to adjust a gas flow rate or operate the apparatus safely, a mass flow controller 4, a stop valve 5, and a safety valve 6 are also used. An operation for an ammonothermal treatment is carried out after exhausting the air in the system and then sealing a predetermined amount of ammonia.

Example 1

<Preparation of C12A7 Compound Including Oxygen Ions>

Powders of $CaCO_3$ and $Al_2O_3$ were mixed each other such that a ratio between Ca and $Al_2$ is 12:7, and the mixture was heated in an alumina crucible at 1,300° C. for 6 hours. The obtained powder (referred to as C12A7:O) was pulverized with an alumina mortar.

<Preparation of C12A7 Compound Including Conduction Electrons>

After the obtained C12A7:O was further heated at 1,350° C. for 24 hours, the powder was inserted into a silica glass tube and heated with an equal amount of a metal Ti powder in vacuum of $1\times10^{-4}$ Pa at 1,100° C. for 24 hours. After the reaction, TiOx adhering to the surface was removed in a mechanical manner. The concentration of conduction electrons of the obtained C12A7:e was about $1.1\times10^{21}$ cm$^{-3}$.

<Method of Determining Content of Nitrogen Anions>

The amount of nitrogen anions in the sample was measured by ion chromatography or temperature programmed desorption gas analysis according to NON-PATENT DOCUMENTs 10 and 11. The concentration of $NH^{2-}$ and the weight percentage of NH can be easily calculated from a chemical formula $[Ca_{24}Al_{28}O_{64}]^{4+} \cdot xNH^{2-}$ (x=0 to 2), when x=2, the concentration of $NH^{2-}$ contained is $1.14\times10^{21}$ cm$^{-3}$, and the weight percentage of NH is 1.08% by weight.

[NON-PATENT DOCUMENT 10]: F. Hayashi, K. Ishizu, M. Iwamoto, Journal of American Ceramic Society, 93, 104-110 (2010).

[NON-PATENT DOCUMENT 11]: F. Hayashi, Y Toda, Y Kanie, M. Kitano, Y Inoue, T. Yokoyama, M. Hara, H. Hosono, Chemical Science, 4, 3124-3130 (2013).

Figure 1:
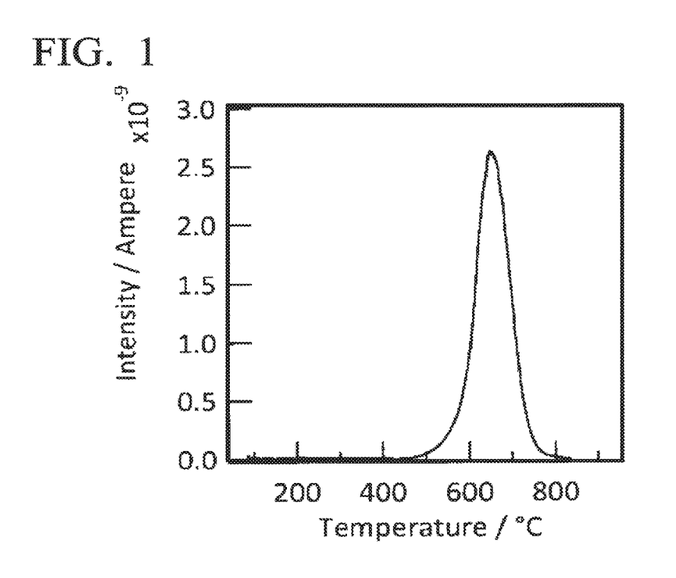
FIG. 1 shows a temperature programmed desorption spectrum of a compound of the present invention.

In the former case, 5 to 30 mg of the sample was dissolved in hydrochloric acid or hydrofluoric acid, and the produced ammonium ions were analyzed with an electrical conductivity detector (CDD-10A)-mounted ion chromatography, manufactured by Shimadzu Corporation. The detection limit is 0.001% by weight and this value corresponds to a nitrogen anion concentration of $0.01\times10^{20}$ cm$^{-3}$. In addition, in the latter case, 0.5 to 10 mg of the sample was put into a TDS 1200 apparatus manufactured by ESCO, Ltd., and a temperature rising analysis for desorption gas was carried out at a temperature rising rate of 12° C./min. The result is shown in FIG. 1. The detection limit is 0.0001% by weight and this value corresponds to a nitrogen anion concentration of $0.001\times10^{20}$ cm$^{-3}$.

<Liquefied Ammonia Treatment>

200 mg of C12A7:e and about 5 g of liquid $NH_3$ were placed in a hastelloy autoclave (10 ml, manufactured by Autoclave Engineering Ltd.) and were allowed to react under the conditions of 500° C. and 45 MPa for 3 hours. Here, the pressure value significantly changes depending on the amount of $NH_3$ to be sealed and the dead volume of the apparatus. As long as the sample is immersed in supercritical $NH_3$, the reaction is not significantly affected by the pressure value. Hereinafter, the same will be applied to Examples 2 to 4 and Comparative Examples 1 to 4. In Table 1, the analysis result is shown. The weight percentage of $NH^{2-}$ was 0.021% by weight and the concentration of $NH^{2-}$ was $0.22 \times 10^{20}$ cm$^{-3}$.

Example 2

A mayenite-type compound containing imide anions was prepared in the same manner as in Example 1 except that the reaction temperature was set to 600° C. and the reaction pressure was set to 55 MPa. The analysis result is shown in Table 1. The weight percentage of $NH^{2-}$ was 0.239% by weight and the concentration of $NH^{2-}$ was $2.53 \times 10^{20}$ cm$^{-3}$.

Example 3

A mayenite-type compound containing imide anions was prepared in the same manner as in Example 1 except that the reaction temperature was set to 450° C. and the reaction pressure was set to 40 MPa. The analysis result is shown in Table 1. The weight percentage of $NH^{2-}$ was 0.010% by weight and the concentration of $NH^{2-}$ was $0.11 \times 10^{20}$ cm$^{-3}$.

Example 4

A mayenite-type compound containing imide anions was prepared in the same manner as in Example 2 except that C12A7:O was used as a starting material. The analysis result is shown in Table 1. The weight percentage of $NH^{2-}$ was 0.256% by weight and the concentration of $NH^{2-}$ was $2.71 \times 10^{20}$ cm$^{-3}$.

Comparative Example 1

A mayenite-type compound containing imide anions was prepared in the same manner as in Example 1 except that the reaction temperature was set to 400° C. and the reaction pressure was set to 35 MPa. The analysis result is shown in Table 1. The nitrogen species introduced was not detected at all.

Comparative Example 2

A mayenite-type compound containing imide anions was prepared in the same manner as in Example 2 except that CaO was used instead of the C12A7:e powder. The analysis result is shown in Table 1. At this time, the nitrogen species introduced was not detected as in Comparative Example 1.

Comparative Example 3

A mayenite-type compound containing imide anions was prepared in the same manner as in Example 2 except that $Al_2O_3$ was used instead of the C12A7:e powder. The analysis result is shown in Table 1. The nitrogen species contained was not detected as in Comparative Examples 1 and 2.

Comparative Example 4

A mayenite-type compound containing imide anions was prepared in the same manner as in Example 2 except that $CaO \cdot Al_2O_3$ was used instead of the C12A7:e powder. The analysis result is shown in Table 1. The nitrogen species contained was not detected as in Comparative Examples 1 to 3.

TABLE 1

| | | | | $NH^{2-}$ | |
| --- | --- | --- | --- | --- | --- |
| | Matrix | Temperature/° C. | Pressure/MPa | Weight Percentage/ wt % | Concentration/ $10^{20}$ cm$^{-3}$ |
| Example 1 | C12A7: e | 500 | 45 | 0.021 | 0.22 |
| Example 2 | C12A7: e | 600 | 55 | 0.239 | 2.53 |
| Example 3 | C12A7: e | 450 | 40 | 0.010 | 0.11 |
| Example 4 | C12A7: O | 600 | 55 | 0.256 | 2.71 |
| Comparative Example 1 | C12A7: e | 400 | 35 | 0.000 | 0 |
| Comparative Example 2 | CaO | 600 | 55 | 0.000 | 0 |
| Comparative Example 3 | $Al_2O_3$ | 600 | 55 | 0.000 | 0 |
| Comparative Example 4 | $CaO \cdot Al_2O_3$ | 600 | 55 | 0.000 | 0 |

Figure 3:
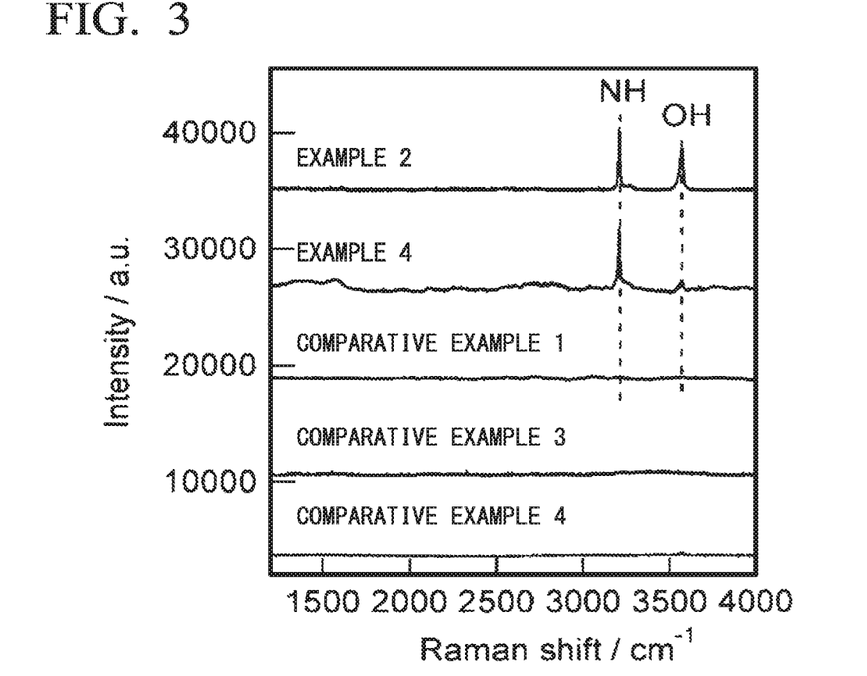
FIG. 3 shows Raman spectra of the compounds of the present invention.

FIG. 3 shows Raman spectra of the samples after liquefied ammonia treatment obtained in Examples 2 and 4 and Comparative Examples 1, 3, and 4. Regarding the samples obtained in Examples 2 and 3, one sharp signal belonging to $NH^{2-}$ ions was observed at 3,210 cm$^{-1}$. However, regarding the samples obtained in Comparative Examples 1, 3, and 4, $NH^{2-}$-derived signal was not observed. That is, it was confirmed that only the compound having a mayenite structure contains $NH^{2-}$.

Figure 4:
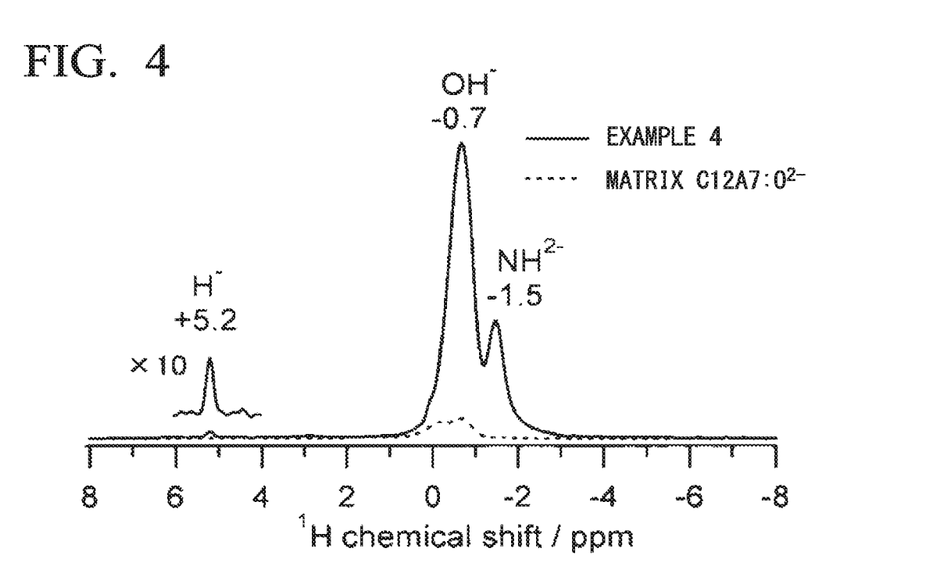
FIG. 4 shows $^1$H MAS NMR spectra of the compound of the present invention.

FIG. 4 shows $^1H$ MAS NMR spectra of the sample obtained in Example 4. In the preparation of the sample, $^{15}NH_3$ was used instead of $^{14}NH_3$. Regarding the sample of C12A7:O before reaction, a signal having a weak intensity near −0.7 ppm and belonging to OH$^-$ by NON-PATENT DOCUMENT 12 was observed. When an ammonia treatment was carried out, the OH$^-$-derived signal intensity was increased and a new signal was observed at +5.2 ppm and −1.5 ppm. The former and the latter belong to H$^-$ and $NH^{2-}$, respectively.

[NON-PATENT DOCUMENT 12]: K. Hayashi, Journal of Solid State Chemistry, 184, 1428-1432 (2011)

[Evaluation Test 1]

In order to evaluate stability in the atmosphere, the sample obtained in Example 4 was used and left to stand at room temperature in the atmosphere for 40 days. After 40 days, the concentration of $NH^{2-}$ in the sample was $2.65 \times 10^{20}$ cm$^{-3}$.

[Evaluation Test 2]

In order to evaluate stability in a protonic polar solvent, the sample obtained in Example 4 was dispersed in a methanol (MeOH) solvent, and the dispersion was stirred for 10 minutes and then left to stand at room temperature for 10 minutes. The concentration of $NH^{2-}$ in the sample which had been treated with the MeOH solvent was $2.60 \times 10^{20}$ cm$^{-3}$.

[Evaluation Test 3]

In order to evaluate stability in a non-protonic polar organic solvent, the sample obtained in Example 4 was dispersed in tetrahydrofuran (THF), and the dispersion was stirred for 10 minutes and then left to stand at room temperature for 10 minutes. The concentration of $NH^{2-}$ in the sample which had been treated with the THF solvent was $2.63 \times 10^{20}$ cm$^{-3}$.

In Table 2, the weight percentages and the concentrations of $NH^{2-}$ contained in the samples before treatment and after treatment were summarized. The concentrations of $NH^{2-}$ before treatment was $2.71 \times 10^{20}$ cm$^{-3}$ as shown in Example 4. On the other hand, as shown in Evaluation Tests 1 to 3, the concentrations of $NH^{2-}$ after treatment were 2.60 to $2.65 \times 10^{20}$ cm$^{-3}$. The reduction amounts before and after treatment were as low as about 4 to 8%, and the samples were stable in the atmosphere or in the organic solvent.

TABLE 2

|  | Atmosphere | Time | Temperature/ °C. | $NH^{2-}$ Weight Percentage/ wt % | $NH^{2-}$ Concentration/ $10^{20}$ cm$^{-3}$ |
|---|---|---|---|---|---|
| Evaluation Test 1 | Atmosphere | 40 Days | 25 | 0.250 | 2.65 |
| Evaluation Test 2 | MeOH | 10 Minutes | 25 | 0.246 | 2.60 |
| Evaluation Test 3 | THF | 10 Minutes | 25 | 0.248 | 2.63 |

Figure 5:
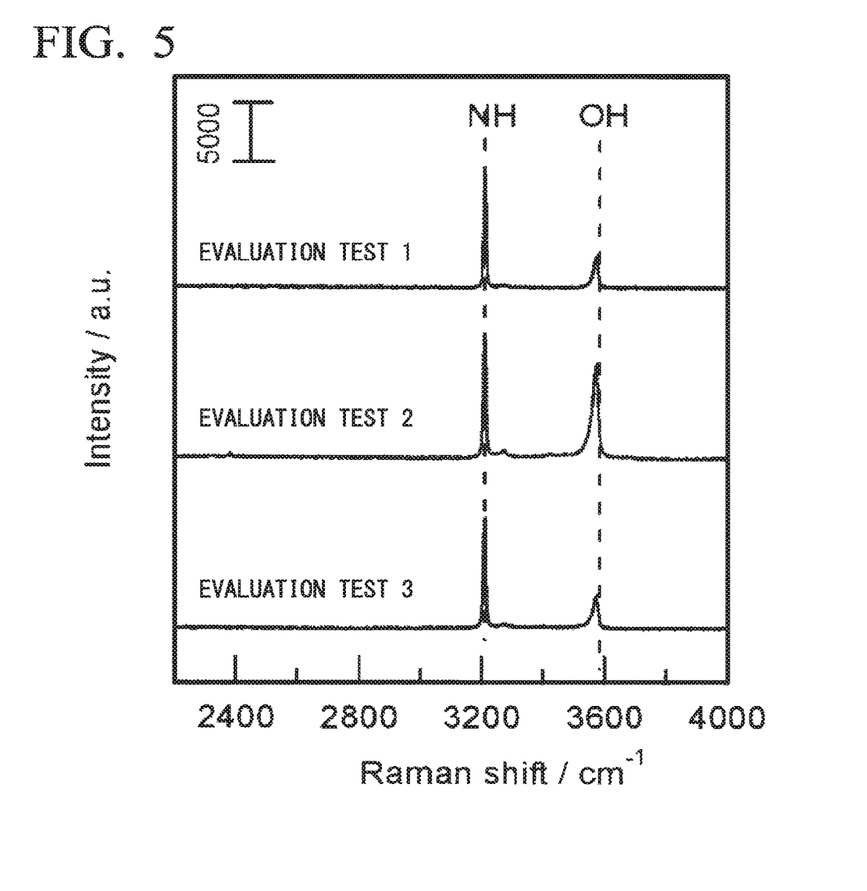
FIG. 5 shows Raman spectra of the compound of the present invention after Evaluation Test 1 in which the compound is stored in the atmosphere, and Evaluation Tests 2 and 3 in which the compound is immersed in an organic solvent.

FIG. 5 shows Raman spectra of the samples after Evaluation Tests 1 to 3 are carried out and the spectra were compared with the spectrum of the sample before treatment (Example 4). It was confirmed from the Raman spectra measurement that the shapes or the intensities of the $NH^{2-}$-derived signal rarely change before and after treatment, and the imide anions in the cage can be stably present in the atmosphere or in the organic solvent.

INDUSTRIAL APPLICABILITY

The present invention makes it possible to incorporate active imide anions in a solid. It is assumed that the clathrated imide anions have high nucleophilicity due to the chemical structure thereof. The mayenite-type compound containing imide anions is stable at about 500° C. in the temperature programmed desorption analysis and thus the compound is expected to be able to be used as an organic reaction reagent for forming a C—N bond which is important in organic synthetic chemistry. In addition, the nitrogen species contained can be released in the form of ammonia at 500° C. or higher (FIG. 1).

The invention claimed is:

1. A mayenite-type compound,
    wherein imide anions are incorporated into the mayenite-type compound at a concentration of $1 \times 10^{18}$ cm$^{-3}$ or more, and
    the mayenite-type compound is a compound having the same type of crystal structure as a crystal structure of mayenite.

2. A method for producing the mayenite-type compound according to claim 1 comprising:
    heating a mayenite-type compound including electrons or free oxygen ions in a cage thereof, in liquefied ammonia at 450° C. to 700° C. and at a pressure of 30 to 100 MPa.

3. An imide anion supplying material comprising the mayenite-type compound according to claim 1.

4. An ammonia supplying material comprising the mayenite-type compound according to claim 1.

5. The mayenite-type compound according to claim 1, wherein imide anions are incorporated into the mayenite-type compound at a concentration of $1 \times 10^{18}$ cm$^{-3}$ to $1.1 \times 10^{21}$ cm$^{-3}$.

6. The method according to claim 2, comprising heating a mayenite-type compound including electrons or free oxygen ions in a cage thereof, in liquefied ammonia at 450° C. to 650° C. and at a pressure of 30 to 100 MPa.

* * * * *